G. E. CLARKE.

Improvement in Fanning Mills.

No. 4,853. Reissued April 9, 1872.

Witnesses:
Franck L. Durand
C. L. Everd.

Inventor
Greville E. Clarke.
per Alexander T. Mason
*Attorneys.*

AM. PHOTO-LITHOGRAPHIC CO. N.Y. (OSBORNE'S PROCESS.)

UNITED STATES PATENT OFFICE.

GREVILLE E. CLARKE, OF KENOSHA, WISCONSIN, ASSIGNOR TO ZALMON G. SIMMONS.

IMPROVEMENT IN FANNING-MILLS.

Specification forming part of Letters Patent No. 112,687, dated March 14, 1871; reissue No. 4,853, dated April 9, 1872.

*To all whom it may concern:*

Be it known that I, GREVILLE E. CLARKE, of Kenosha, in the county of Kenosha and State of Wisconsin, have invented certain new and useful Improvements in "Fanning-Mills;" and do hereby declare the following to be a full, clear, and exact description thereof, reference being had to the accompanying drawing and to the letters of reference marked thereon.

The nature of my invention consists in the construction of the heading for fanning-mills, and also in the mode of connecting or attaching said heading to the sides of the mill.

In order to enable others skilled in the art to which my invention appertains to make and use the same, I will now proceed to describe its construction and operation, referring to the annexed drawing, in which—

Figure 1:
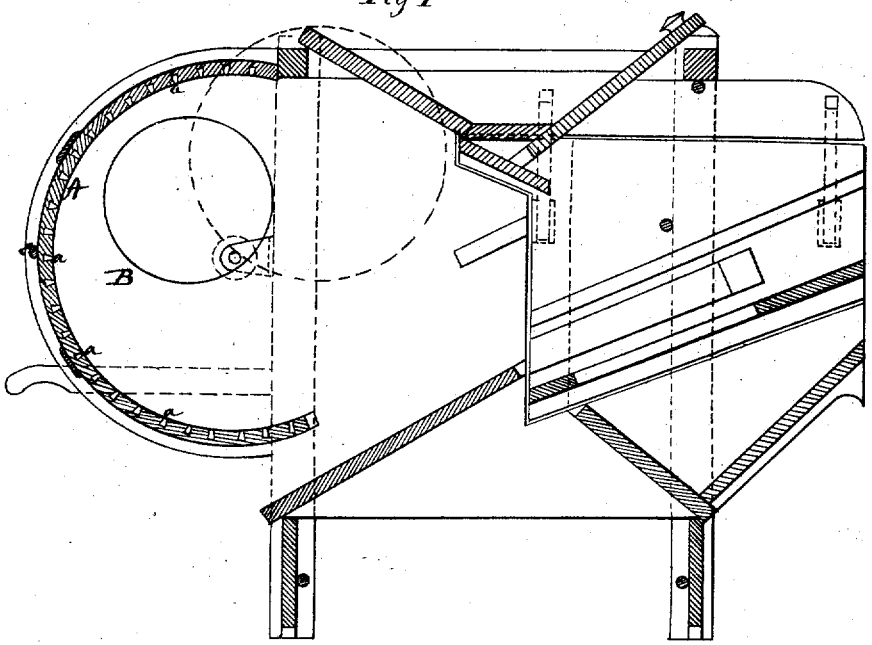
Figure 2:
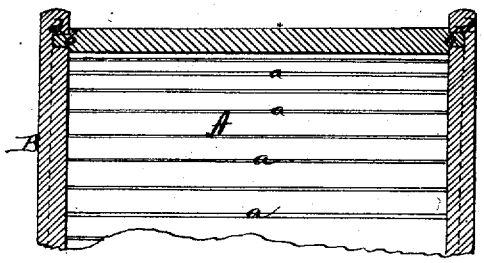

Figure 1 is a longitudinal vertical section of my fanning-mill, and Fig. 2 is a section of the heading.

Hitherto great trouble has been experienced in not having the heading of fanning-mills air-tight, as by the sun and weather the slats or pieces of which they are made will shrink and allow the air and also dust to pass through.

To avoid this I construct the heading A of one piece, into one side of which I cut the grooves *a a*, as shown in the drawing, by which I am enabled to bend it and make it conform to the shape usually required. I also can flatten this heading out to allow it to be easier packed for transportation. The edges of the heading, which are to connect with the sides B B, are cut so as to form tenons *b b*, as shown in Fig. 2. I furthermore provide a groove, *d*, in each side B of the end of the fanning-mill, into which are fitted the tenons *b b*, thereby securely holding the heading in place by passing the bolts *e* through the sides of the mill.

The shoe of the fanning-mill may in like manner be provided with grooves to receive the ends of its cross-sections, and then secured by bolts. In fact, all the parts of a fanning-mill may be put together in this manner, whereby it may be very readily taken to pieces, packed in small compass for shipment, and put together at the place of destination by almost anybody.

Having thus fully described my invention, what I claim as new, and desire to secure by Letters Patent, is—

The fanning-mill herein described as a new article of manufacture, consisting of the said several parts, constructed and arranged as specified and shown, to allow of said mill being set up and taken apart with facility and dispatch for the purpose of transportation, as aforesaid.

In testimony that I claim the foregoing I have hereunto set my hand and seal this 19th day of February, 1872.

GREVILLE E. CLARKE. [L. S.]

Witnesses:
C. L. EVERT.
A. N. MARR.